United States Patent
Jones et al.

(10) Patent No.: US 8,627,494 B2
(45) Date of Patent: Jan. 7, 2014

(54) CLASSIFICATION SEPARATION ROUTER

(75) Inventors: Daniel H. Jones, Round Rock, TX (US); Thomas G. Lendacky, Austin, TX (US); Emily J Ratliff, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 12/561,813

(22) Filed: Sep. 17, 2009

(65) Prior Publication Data

US 2011/0067113 A1    Mar. 17, 2011

(51) Int. Cl.
*G06F 21/00* (2013.01)

(52) U.S. Cl.
USPC .......................................................... 726/27

(58) Field of Classification Search
USPC .......................................... 726/27; 711/173
See application file for complete search history.

(56) References Cited

U.S. PATENT DOCUMENTS

| | | | |
|---|---|---|---|
| 6,665,786 B2 | 12/2003 | McMichael et al. | |
| 6,801,948 B2 * | 10/2004 | Clark et al. | 709/231 |
| 7,185,192 B1 * | 2/2007 | Kahn | 713/155 |
| 2003/0023826 A1 | 1/2003 | McMichael et al. | |
| 2005/0132070 A1 * | 6/2005 | Redlich et al. | 709/228 |
| 2007/0250921 A1 | 10/2007 | LiVecchi | |
| 2008/0066143 A1 | 3/2008 | Tai et al. | |

OTHER PUBLICATIONS

Boettcher et al., "The MILS Component Integration Approach to Secure Information Sharing," Digital Avionics Systems Conference, 2008.
Alves-Foss J. et al., "The MILS Architecture for High-Assurance Embedded Systems," International Journal of Embedded Systems, Feb. 2005, pp. 1-9.

* cited by examiner

*Primary Examiner* — Kambiz Zand
*Assistant Examiner* — Ali Shayanfar
(74) *Attorney, Agent, or Firm* — Lieberman & Brandsdorfer, LLC (57) ABSTRACT

A method and system are provided to classify and convey data to satisfy a client request. The classification system is a two dimensional data classification system, including a first dimension pertaining to subject matter and a second dimension pertaining to data security. A partition is dynamically created, and data that satisfies the request populates the created partition to convey parsed data based satisfying both dimensions of the request.

17 Claims, 5 Drawing Sheets

CLASSIFICATION SEPARATION ROUTER

BACKGROUND OF THE INVENTION

1. Technical Field

This invention relates to classification of electronic data. More specifically, partitions, containing only data at a given classification, are dynamically instantiated and employed for conveyance of classified data to ensure data security.

2. Description of the Prior Art

Information technology systems are becoming increasingly important to all aspects of organizations. As a result, the size and complexity of many information technology systems are growing rapidly. For example, an enterprise information technology system may include data centers at a plurality of sites, with a plurality of high-bandwidth communications channels between each data center. In addition, each data center may include a plurality of devices, herein referred to as elements, including mainframe computers, servers, data storage libraries, data storage devices, routers, switches, terminals, workstations, printers, and the like.

With the growth of such systems has come the expansion of data. In recent years, data storage mediums have become relatively inexpensive, and as such, there has been an increased awareness of data storage. Tools have developed to process requests for data retained within the vast quantities of data storage. However, with the growth of electronic data, also comes concern with security of the data. Within an employment structure, a hierarchy is established with different security level assignments within the hierarchy. This is to ensure that those that access different levels in the hierarchy have limits on the data to which they have access. It is known in such a system to create partitions to limit access to the data. One example is shown in U.S. Pat. No. 6,665,786 to McMichael et al. Such partitions are persistent as they are created in the storage system itself. However, there is a danger pertaining to the security of persistent partitions, as they are known, including the security of the partition itself.

From the foregoing discussion, it should be apparent that a need exists for an apparatus, system, and method that provide a venue to convey data in a secure and non-persistent manner. Such an apparatus, system, and method would provide focused data security through a non-persistent venue.

SUMMARY OF THE INVENTION

This invention comprises a method, system, and article for using dynamically created ephemeral partitions to securely deliver classified electronic data.

In one aspect of the invention, a method is provided for addressing a request for classified electronic data from a trusted server. Data is segregated into at least two classifications. The server obtains the request for data, filtering any information not appropriate for the classification of the requestor. An identifier associated with the request includes a security attribute. To satisfy the request, data is filtered from the storage based upon presence of the security attribute in one or more classifications of the data and based upon presence of a security policy that defines access to the data classifications. In addition, a partition is dynamically created to contain the filtered data. The newly created partition is populated with a copy of the filtered data to satisfy the request.

In another aspect of the invention, a computer system is provided with a server in communication with a data storage medium, wherein data stored local to the storage is segregated into at least two classifications. A receiving manager is provided in communication with the server. The receiving manager is configured to receive a request for data, with the request having an identifier with a security attribute. A filter is provided in communication with the receiving manager. The filter parses data from the storage based upon presence of the security attribute in at least one of the classifications of the data, and based upon presence of a security policy defining access to the classifications of data. In addition, a partition manager is provided in communication with the receiving manager. The partition manager is responsible for dynamically creating a partition to contain the filtered data. More specifically, the partition manager satisfies the request by populating the created partition with a copy of the filtered data.

In yet another aspect of the invention, an article is provided with a computer-readable carrier including computer program instructions configured to address a request for classified electronic data. Instructions are provided to separate stored data into at least two classifications, and to receive a request for data. An identifier associated with the request includes a security attribute. Instructions are provided to filter data from the storage based upon presence of the security parameter in at least one of the classifications of the data and based upon presence of a security policy defining access to the classifications of data. In addition, instructions are provided to dynamically create a partition configured to contain the filtered data. To satisfy the request, the created partition is populated with a copy of the filtered data.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The manager may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of receiving manager, filter, partition manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

Data may be classified for various reasons, including topics and/or security. By classifying data, it may be parsed to satisfy data requests and to yield results specific to a request. Security classification may be based upon security labels consisting of a hierarchy of security levels and non-hierarchical categories, roles, groups, organizations, etc. Each security classification is associated with an identifier, which is then employed as a field to satisfy a data request.

A system which has access to all classifications of data, and which interacts directly with users to deliver only the classified data to which the requester is authorized, is at risk of leaking unauthorized data. The leak may be the result of an intentional exploitation of vulnerability, or may be an inadvertent result of a software defect. A system which only hosts single classifications of data cannot leak other data classifications even if it is successfully attacked. While single category systems enhance data security, there may be insufficient resources to simultaneously host all categories. Dynamically instantiated ephemeral partitions allow a potentially large number of data classifications to be delivered from single classification partitions with fewer resources.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Figure 1:
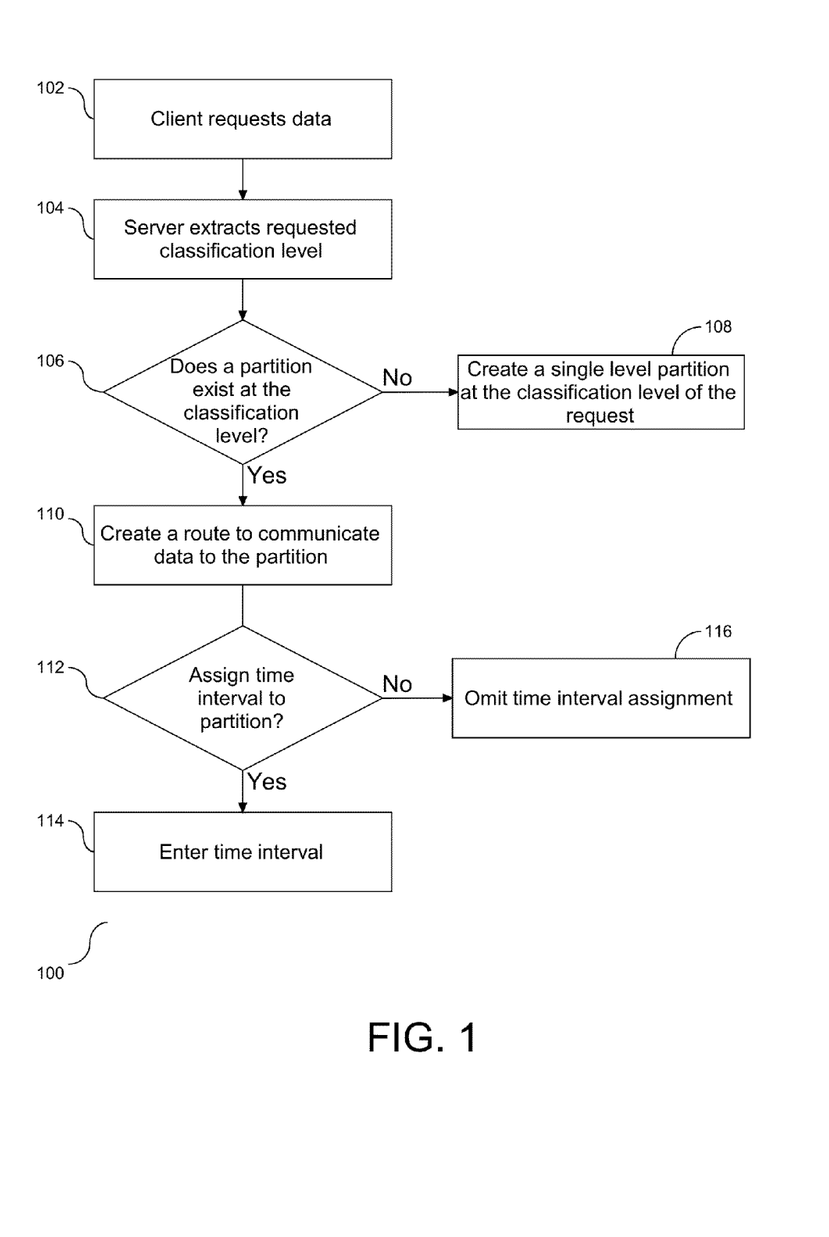
FIG. 1 is a flow chart illustrating creation of a single level partition within a multi-level partition.

FIG. 1 is a flow chart (100) illustrating the process of creating a single level partition within a multiple level partition for requested data. Initially a client machine requests data from a server (102). The requested data includes two fields, a first field containing a subject category, and a second field containing a data security level. Upon receipt of the data request at step (102), the server obtains the classification level from the data request (104). In one embodiment, the server employs a hypervisor for receipt and management of data requests. A hypervisor is a software program that manages multiple operating systems, or multiple instances of the same operating system, on a single computer system. The hypervisor manages the system's processor, memory, and other resources to allocate resources based upon the requirements of each operating system. Following step (104), it is determined if a partition at the classification level of the data request is present in the system (106). In one embodiment, the determination at step (106) includes an investigation of the multiple level partitions for the requested classification level associated with the data request. A negative response to the determination at step (106) is followed by creation of a single level partition at the classification level of the data request (108). In one embodiment, the partition created at step (108) is a new single level partition within the multiple level partitions. Following step (108) or a negative response to the determination at step (106), a route is created to communicate the requested data to the appropriate single level partition (110). Regardless of whether the partition previously existed or was dynamically created in response to the data request, it is determined if a time interval for which the single level partition will remain active should be assigned to the partition (112). A positive response to the determination at step (112) is followed by entry of a time interval for the subject partition (114). Conversely, a negative response to the determination at step (112) is followed by omission of a time interval assignment to the subject partition (116). Accordingly, a single level partition is employed to route data at a particular classification level within a multi-level partition of the server.

Figure 2:
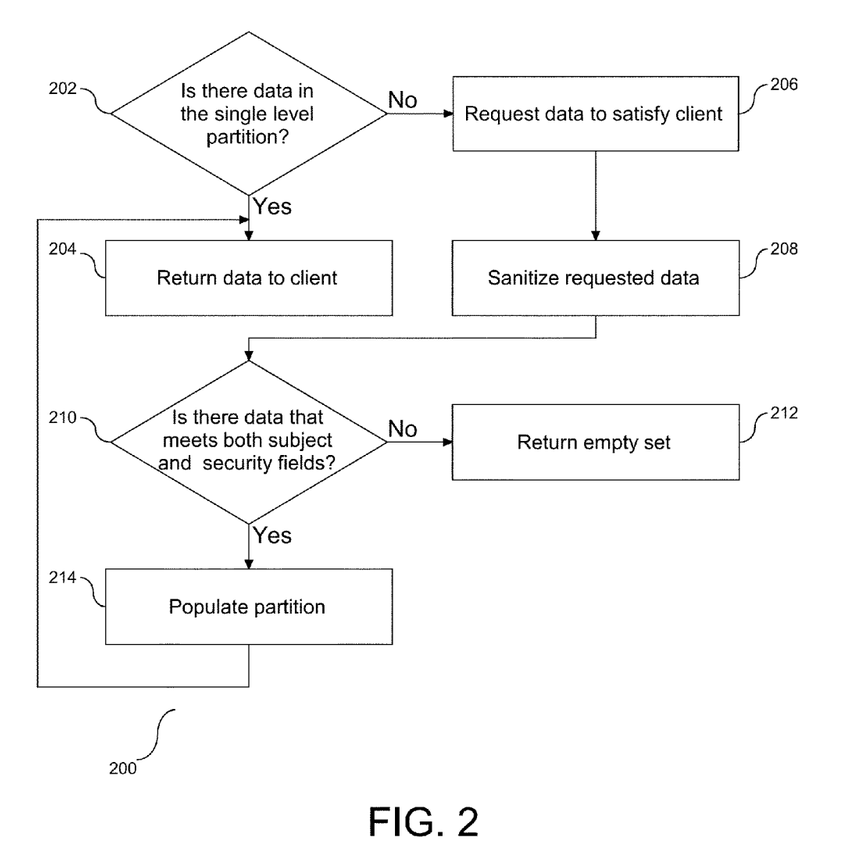
FIG. 2 is a flow chart illustrating communication of data from a server to a single level partition.

Once the single level partition is created, or identified as existing in the system, a route for data communication is established. FIG. 2 is a flow chart (200) illustrating a process for communicating data from the server to the subject single level partition. Initially, it is determined if there is data in the subject single level partition (202). A positive response is followed by the subject single level partition returning data to the client machine (204). In one embodiment, the pre-existence of the subject single level partition is an indication that it has been pre-populated with data that satisfies the data request. Conversely, a negative response to the determination at step (204) is followed by the subject single level partition requesting data from the multiple level partition to satisfy the client request (206). In response to the data request (206), the multiple level partitions sanitize the requested data (208). Each data request from a client machine includes a subject category field and a data security level field. As such, all data must be redacted to protect the security policy for each single level partition. In one embodiment, and as demonstrated herein, the security policy is enforced when data is placed in the partition. The aspect of security enforcement does not change data; rather it ensures that data for each single level partition is unique to that partition. In one embodiment, the security policy may be enforced at the partition creation or data population thereof, and the invention should not be limited to the embodiment shown herein. Once the data has been sanitized to meet the security level of the respective single level partition, it is determined if there is any data that meets both the subject category field and a data security level (210). A negative response to the determination at step (210) concludes the data request by returning an empty set to the requesting client (212). Conversely, a positive response to the determination at step (210) is followed by populating the subject single level partition with the data that meets both the subject category field and the data security level (214). Thereafter, the subject single level partition with the populated data returns the populated data to the client machine. Accordingly, a single level partition is employed or dynamically created as a logical volume to convey data pertaining to a specific category and data security level to a client machine.

Figure 3:
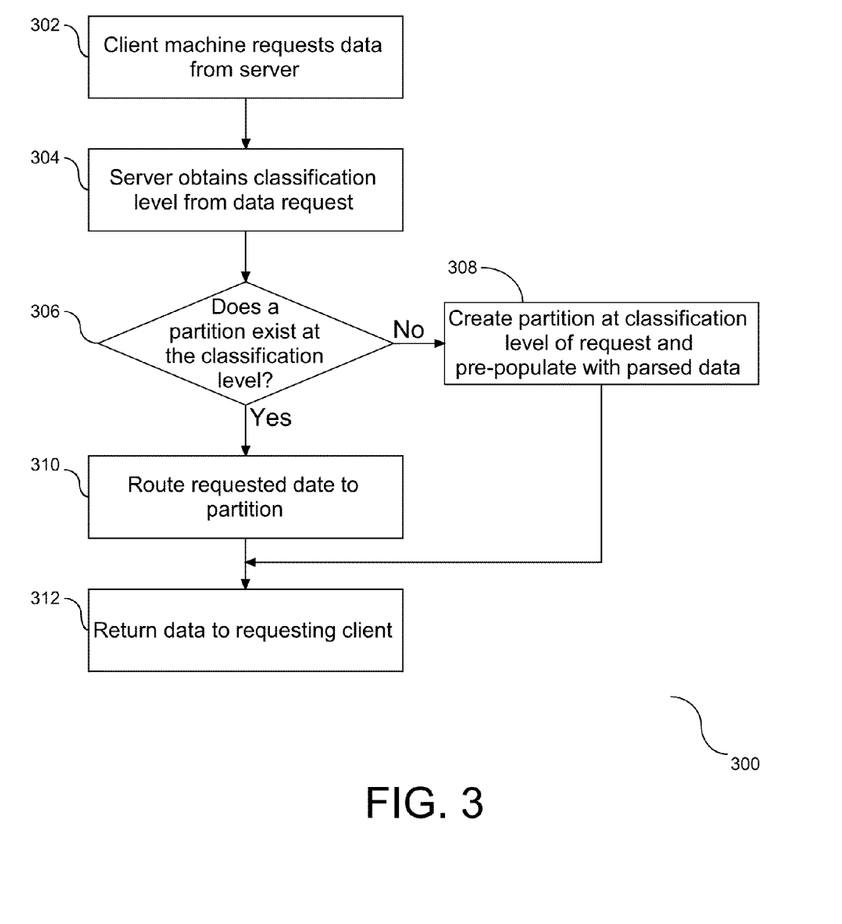
FIG. 3 is a flow chart illustrating an alternative process for conveying data through a single level partition.

In FIGS. 1 and 2, a single level partition is employed or created and populated with data in response to the client request. FIG. 3 is a flow chart (300) illustrating an alternative process for conveying data to a client through a single level partition. As shown, a client machine requests data from a server (302). The requested data includes two fields, a first field for a subject category and a second field for a data security level. In one embodiment, the request includes an identifier in the form of a security attribute. Upon receipt of the data request at step (302), the server obtains the classification level from the data request (304). In one embodiment, the server employs a hypervisor for receipt and management of data requests. Following step (304), it is determined if a partition at the classification level of the data request is present in the system (306). A negative response to the determination at step (306) is followed by creation of a single level partition at the classification level of the data request (308), together with pre-populating the created partition with parsed data that meets the client request based upon both the request subject matter and data security level. Conversely, a positive response to the determination at step (306) is followed by the server routing the requested data to the subject partition (310). In one embodiment, a hypervisor local to the server routes the requested data to the subject partition. Following completion of the population of data in the subject partition at either step (308) or (310), the subject partition returns the data to the requesting client (312). Accordingly, the process shown herein is an alternative aspect of dynamically creating a subject single level partition, populating the subject partition with parsed data, and communicating the populated data of the subject partition to the requesting client.

Figure 4:
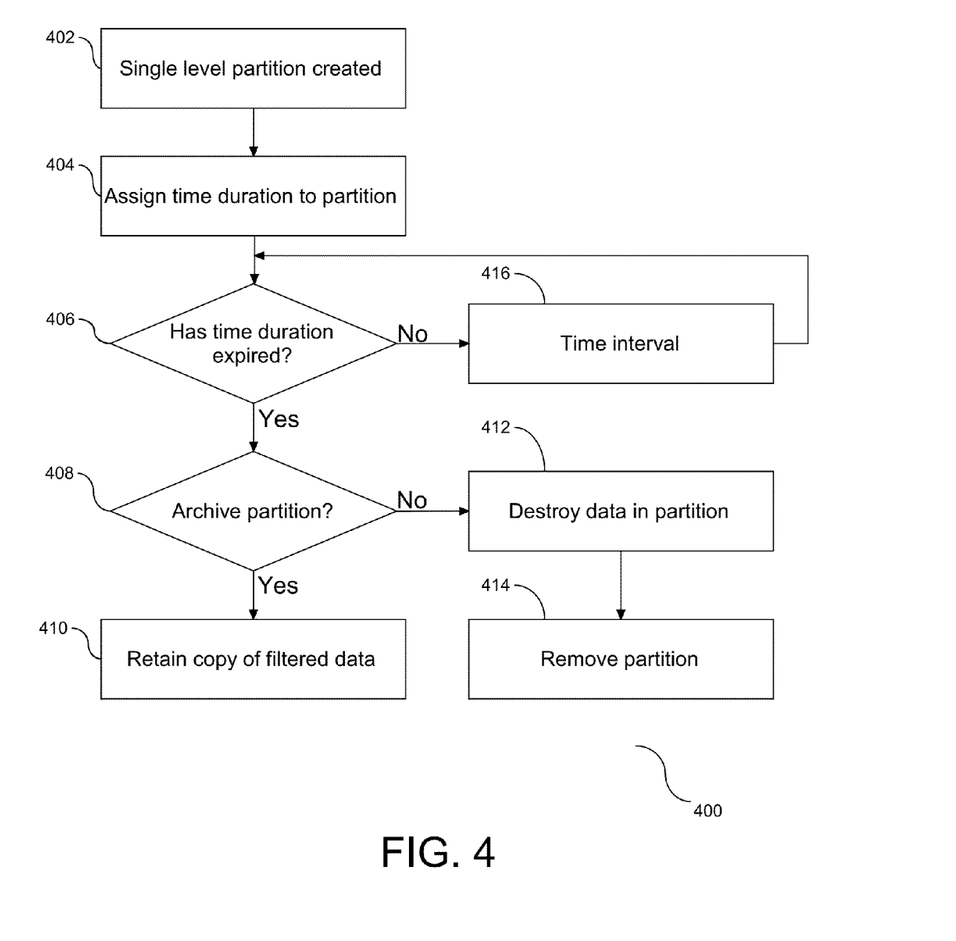
FIG. 4 is a flow chart illustrating expiration of a single level partition.

The multiple level partitions may create a plurality of single level partitions to communicate a plurality of data requests to one or more client machines in communication with the server. In one embodiment, the single level partition may only be active for a specific duration of time. Once the time duration expires, the single level partition expires as well. FIG. 4 is a flow chart (400) illustrating a process for addressing expiration of a single level data partition. A single level partition is created in response to a client request for data (402). At the time of creation of the partition, time duration is assigned to the subject partition (404). The time duration identifies the maximum time the subject partition will remain active and available to the client machine. Following step (404), it is determined if the time duration for the subject partition has ended (406). A negative response to the determination at step (406) is followed by waiting a period of time (416) and a return to step (406). Conversely, a positive response to the determination at step (406) is followed by a subsequent determination indicating whether the subject partition will be archived following expiration of the time duration (408). A positive response to the determination at step (408) is followed by retention of a copy of the filtered data (410). In one embodiment, the data in the partition is archived and the partition is removed. Conversely, a negative response to the determination at step (408) is followed by destruction of the data retained in the subject partition (412) and removal of the subject partition (414). Accordingly, each subject single level partition may be removed with or without archiving the data stored within the partition.

Figure 5:
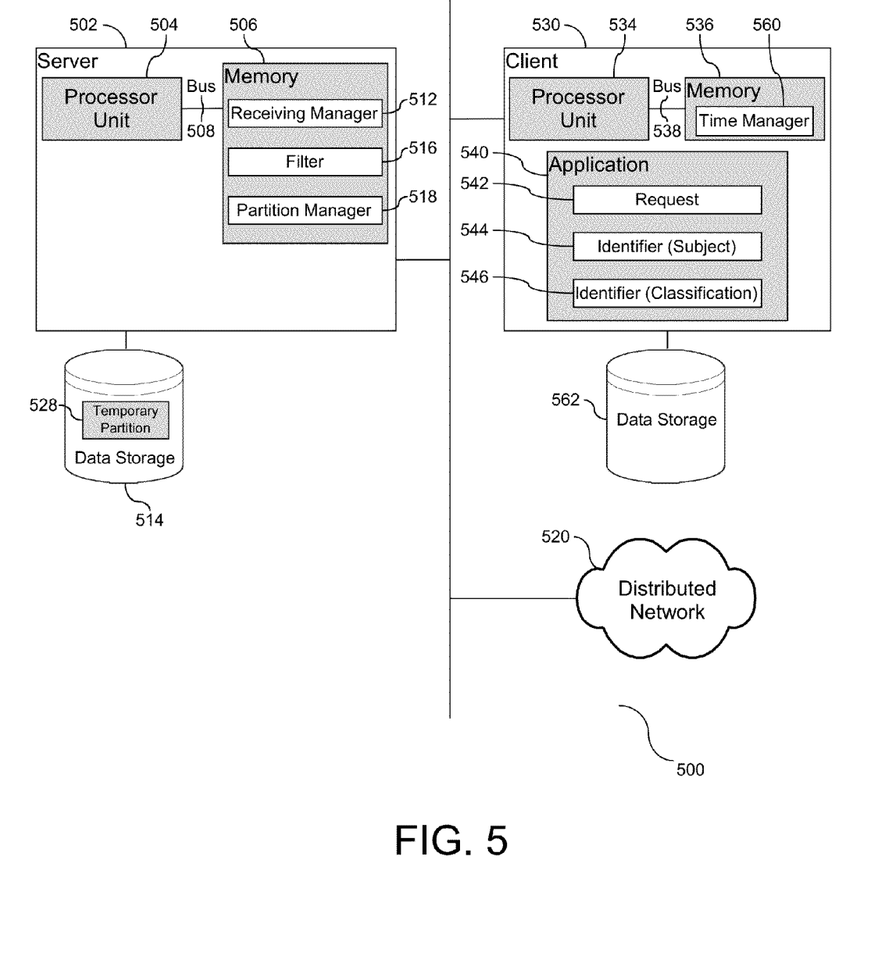
FIG. 5 is a block diagram illustrating creation of one or more single level partitions for satisfying data requests according to the preferred embodiment of this invention, and is suggested for printing on the first page of the issued patent.

Data requests are submitted to a server from a requestor. The server processes the request(s) based upon the request parameters. As described above, each data request is accompanied by two identifiers, one for a subject category, and the second for security classification information. FIG. 5 is a block diagram (500) of a computer system employing a multiple level partition for creation of multiple single level partitions to address one or more requests for data having different characteristics. As shown, a server (502) is provided in communication with a distributed network (520) from which it gathers and receives data and a client machine (540) to which it services request for data. The server (502) includes a processing unit (504) in communication with memory (506) across a bus (508). Although only one processing unit (504) is shown, the invention should not be limited to the quantity shown herein. In one embodiment, two or more processing units may be provided in the server. The server is also provided with a receiving manager (512) in communication with the processing unit (504) and memory (506), and data storage (514). The receiving manager (512) is configured to receive data requests from one or more client machines. Each data request is accompanied with both the subject identifier and the security level identifier. The receiving manager (512) is in communication with a filter (516), which parses the data based upon the identifiers provided with the request. In one embodiment, the filter (516) redacts data for both the requests subject category and data security level. All data that satisfies the request is then processed by a partition manager (518), which is in communication with the receiving manager (512). The partition manager (518) either dynamically creates a temporary partition (528) or employs an appropriately categorized and previously created temporary partition to receive the parsed data. In one embodiment, the partition manager (518) is in the form of a hypervisor which creates one or more partitions in the form of logical computing systems within a physical computing system.

A client machine (530) is provided in communication with the server (502). The client machine includes a processing unit (534) in communication with memory (536) across a bus (538). Although only one processing unit (534) is shown, the invention should not be limited to the quantity shown herein. In one embodiment, two or more processing unit may be provided in the client machine (530). An application (540) is provided to request and receive data from the server (502). In one embodiment, the application is in the form of a browser. Each request (542) for data transmitted from the client machine (530) includes a subject identifier (544) and a classification identifier (546). Upon receipt of the request (542) by the server (502), hypervisor (512) creates a temporary partition (550) to service the request. All parsed data that satisfies the request is placed in the temporary partition (550), which is then forwarded to the client machine (530). In one embodiment, the temporary partition is a logical computer within the server. The partition is logically isolated from other resources on the system and only contains data at the security level appropriate for users granted access to the partition. In one embodiment, the temporary partition is a non-persistent partition that is logically isolated. The temporary partition propagates data to the client machine (530), which may store the received data in a local storage medium.

In one embodiment, a time manager (560) may be provided local to the client machine (530). The time manager (560) functions to either destroy or archive the data conveyed in the temporary partition. More specifically, the time manager (560) may remove the temporary partition following expiration of a time interval. Removal of the partition includes destroying all of the data maintained local to the partition. Conversely, the time manager (560) may archive the temporary partition, which may include but is not limited to, maintaining a copy of the filtered data in data storage (562) local to the client machine (530). Accordingly, the populated temporary partition may be retained in local data storage of the requesting client, or removed following an expiration of a time interval.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium is an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual processing of the program code, bulk storage, and cache memories which provide temporary storage of at least some program code in order to reduce the number of times code must be retrieved from bulk storage during processing.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening networks.

The software implementation can take the form of a computer program product accessible from a computer-useable or computer-readable medium providing program code for use by or in connection with a computer or any instruction processing system.

Advantages Over the Prior Art

Multiple single level (MSL) security separates different classifications of data using separate machines (or virtual machines) for each classification. Use of dynamically created ephemeral partitions, as taught herein, provides the security of Multiple Single Level (MSL) systems with minimal hardware resources, thereby making it a cost effective solution while providing enhanced security for communication of data.

Alternative Embodiments

It will be appreciated that, although specific embodiments of the invention have been described herein for purposes of illustration, various modifications may be made without departing from the spirit and scope of the invention. In particular, data categorization may be expanded to include one or more additional categories to further define and parse the data. Accordingly, the scope of protection of this invention is limited only by the following claims and their equivalents.

We claim:

1. A method for addressing a request for classified electronic data, comprising:
   segregating data stored in a storage into at least two classifications;
   receiving a request for data, wherein an identifier associated with the request includes a security attribute and a subject category;
   filtering data from the storage based upon presence of the security attribute in at least one of the classifications of the data and based upon presence of a security policy defining access to the classifications of data;
   dynamically creating a partition to contain request-specific filtered data in response to the request;
   populating the created partition with a copy of the filtered data, wherein the created partition contains only data meeting the security policy and the subject category of the request; and
   redirecting the request to the created partition to satisfy the request from the created partition.

2. The method of claim 1, further comprising assigning a time interval for active status of the created partition.

3. The method of claim 2, further comprising destroying the created partition following expiration of the time interval.

4. The method of claim 3, further comprising destroying the filtered data maintained local to the partition.

5. The method of claim 2, further comprising archiving the created partition following expiration of the time interval.

6. The method of claim 1, wherein the created partition is configured to receive data filtered for a single classification.

7. A computer system, comprising:
   a server in communication with a data storage medium;
   data stored local to the storage medium segregated into at least two classifications;
   a receiving manager in communication with the server configured to receive a request for data, the request having an identifier with a security attribute and a subject category;
   a filter in communication with the receiving manager, the filter to parse data from the storage medium based upon presence of the security attribute in at least one of the classifications of the data and based upon presence of a security policy that defines access to the classifications of data;

a partition manager in communication with the receiving manager, the partition manager to dynamically create a partition to contain request-specific filtered data in response to the request, wherein the created partition contains only data meeting the security policy and the subject category of the request;

the partition manager to populate the created partition with a copy of the filtered data to satisfy the request.

8. The system of claim 7, further comprising a time interval assigned to an active status of the created partition.

9. The system of claim 8, further comprising a time manager to destroy the created partition following expiration of the time interval, including destroying the filtered data maintained local to the partition.

10. The system of claim 8, further comprising a time manager to archive the created partition following expiration of the time interval, including maintenance of a copy of the filtered data in local data storage.

11. The system of claim 7, wherein the created partition is configured to receive data for a single classification.

12. An article comprising:

a computer-readable data storage device including computer program instructions configured to address a request for classified electronic data, the instructions comprising:

instructions to separate stored data into at least two classifications;

instructions to receive a request for data, wherein an identifier associated with the request includes a security attribute;

instructions to filter data from a storage based upon presence of the security parameter in at least one of the classifications of the data and based upon presence of a security policy defining access to the classifications of data;

instructions to dynamically create a partition configured to contain the filtered data in response to the request; and instructions to satisfy the request from the created partition, including populating the created partition with a copy of request-specific filtered data and redirecting the request to the created partition, wherein the created partition contains only data meeting the security policy and the subject category of the request.

13. The article of claim 12, further comprising instructions to assign a time interval for active status of the created partition.

14. The article of claim 13, further comprising instructions to destroy the created partition following expiration of the time interval.

15. The article of claim 14, further comprising instructions to destroy the filtered data maintained local to the partition.

16. The article of claim 13, further comprising instructions to archive the created partition following expiration of the time interval.

17. The article of claim 12, wherein the created partition is configured to receive data filtered for a single classification.

* * * * *